(12) United States Patent
Lee et al.

(10) Patent No.: US 8,350,861 B2
(45) Date of Patent: Jan. 8, 2013

(54) METHOD AND SYSTEM FOR SIMULATING CHARACTER

(75) Inventors: Jehee Lee, Seoul (KR); Manmyung Kim, Seoul (KR); Kwang Won Sok, Seoul (KR)

(73) Assignee: SNU R&DB Foundation, Seoul (KR)

( * ) Notice: Subject to any disclaimer, the term of this patent is extended or adjusted under 35 U.S.C. 154(b) by 906 days.

(21) Appl. No.: 12/311,829

(22) PCT Filed: Jul. 24, 2007

(86) PCT No.: PCT/KR2007/003557
§ 371 (c)(1),
(2), (4) Date: Apr. 15, 2009

(87) PCT Pub. No.: WO2009/014273
PCT Pub. Date: Jan. 29, 2009

(65) Prior Publication Data
US 2010/0277483 A1    Nov. 4, 2010

(30) Foreign Application Priority Data
Jul. 23, 2007  (KR) .................. 10-2007-0073313

(51) Int. Cl.
*G06T 15/70* (2006.01)

(52) U.S. Cl. ........ 345/474; 345/419; 345/420; 345/473; 345/629; 463/31

(58) Field of Classification Search .................. 345/419, 345/420, 473–475, 629; 463/31
See application file for complete search history.

(56) References Cited

U.S. PATENT DOCUMENTS

| | | | | |
|---|---|---|---|---|
| 6,115,052 A | * | 9/2000 | Freeman et al. | 345/473 |
| 7,129,949 B2 | * | 10/2006 | Marschner et al. | 345/473 |
| 7,239,718 B2 | * | 7/2007 | Park et al. | 382/103 |
| 7,313,463 B2 | * | 12/2007 | Herr et al. | 700/245 |
| 7,542,040 B2 | * | 6/2009 | Templeman | 345/474 |
| 7,864,181 B1 | * | 1/2011 | Baraff | 345/475 |
| 7,949,498 B2 | * | 5/2011 | Walker et al. | 702/189 |
| 2004/0119716 A1 | | 6/2004 | Park et al. | |
| 2005/0007371 A1 | | 1/2005 | Nam et al. | |

FOREIGN PATENT DOCUMENTS

| | | |
|---|---|---|
| JP | 2002-269580 A | 9/2002 |
| KR | 10-2002-0049384 A | 6/2002 |
| KR | 10-2006-0040215 A | 5/2006 |
| KR | 10-2007-0050509 A | 5/2007 |
| WO | WO 2007/066953 A | 6/2007 |

OTHER PUBLICATIONS

Pouget et al. "Computational approaches to sensorimotor transformations", Nature America Inc. 2000.*
Sharon et al. "Synthesis of Controllers for Stylized Planar Bipedal Walking", IEEE 2005.*
Fang et al. "Efficient Synthesis of Physically Valid Human Motion", ACM 2003.*

* cited by examiner

*Primary Examiner* — Kimbinh T Nguyen
(74) *Attorney, Agent, or Firm* — Nath, Goldberg & Meyer; Jerald L. Meyer

(57) ABSTRACT

A method and system for simulating a character is provided. The method of simulating a character including: optimizing motion data by using a displacement mapping and a Proportional Derivative (PD) control; and performing controller training by using the optimized motion data and controlling a motion of the character. In this instance, the optimizing includes: generating a target motion by using the displacement mapping between an input motion and a displacement parameter; and generating a simulated motion by using the target motion and an objective function.

28 Claims, 9 Drawing Sheets

703

702

701

METHOD AND SYSTEM FOR SIMULATING CHARACTER

This is a National Phase Application filed under 35 U.S.C. 371 as a national stage of PCT/KR2007/003557, with the filing date of Jul. 24, 2007, an application claiming the benefit of Korean Patent Application No. 10-2007-0073313, filed on 23 Jul. 2007, the entire content of which is hereby incorporated by reference in its entirety.

TECHNICAL FIELD

The present invention relates to a method and system for simulating a character. Animating biped characters in a physically-simulated virtual world is an important issue in computer animation, robotics, biomechanics, and the like. Many techniques from control theory, machine learning, and the like have been adopted for designing physically-simulated controllers for each individual human behavior such as walking and balancing.

One appealing approach to controller design is learning control strategies from actual human behaviors. Specifically, a plentiful set of motion data can be acquired from a specific behavior performed by an actual human, and information concerning how characters should respond to any predetermined situation can be acquired from the motion data.

As described above, an imitation-based learning approach of learning based on imitation of actual human behaviors demonstrates a possibility of enabling simulated characters and humanoid robots to imitate human motions.

BACKGROUND ART

Despite much research progress of a method of learning based on imitation of actual human behaviors in a conventional art, learning a biped behavior from motion capture data still has a problem when the behavior requires subtle control for maintaining balance, which is difficult to capture from stored motion data.

Also, there is a problem due to physical imprecision of the captured motion data. Specifically, since a dynamic character model is drastically simplified from an actual human, any biped character which exactly follows captured joint angle trajectories loses its balance and falls over in a few steps.

DISCLOSURE OF INVENTION

Technical Goals

The present invention provides a method and system for providing a biped character which can provide a physically-simulated, two-dimensional biped character for imitating actual human behaviors by using a set of motion data recorded from behaviors repeatedly performed by an actual human.

The present invention also provides a method and system for simulating a character which can correct a set of motion data via optimization so that the character being a simplified dynamic model may approximately reproduce recorded motion trajectories by actuating joints of the character while maintaining its balance.

The present invention also provides a method and system for simulating a character which can provide a biped character robustly imitating actual human behaviors by training a device controlling behaviors of the character by using a set of optimized motion data.

The present invention also provides a method and system for simulating a character which can compose trained dynamic controllers into an integrated framework allowing the character to transition between different behaviors of the character.

The present invention also provides a method and system for simulating a character which can provide a biped character by which all controllers are trained, and which is dynamically simulated in real time and controlled interactively to perform motions desired by a user.

Technical Solutions

According to an aspect of the present invention, there is provided a method of simulating a character, the method including: optimizing motion data by using a displacement mapping and a Proportional Derivative (PD) control; and performing controller training using the optimized motion data and controlling a motion of the character.

In an aspect of the present invention, the optimizing includes: generating a target motion by using the displacement mapping between an input motion and a displacement parameter; and generating a simulated motion by using the target motion and an objective function. Also, the motion data includes a plurality of input motions separated by time, and the optimizing further includes: repeatedly performing the generating of the target motion and the generating of the simulated motion for all input motions included in the motion data.

In an aspect of the present invention, the generating of the target motion is a step of generating the target motion by adding, to the input motion, an array of motion displacements generated by the displacement parameter, and each element of the array of motion displacements is calculated by using a bell-shaped basis function.

In an aspect of the present invention, the generating of the simulated motion arbitrarily selects an initial value of the displacement parameter, repeatedly finds a local extremum of different initial values of displacement parameters, and calculates the simulated motion by establishing a minimum value of local extremum values as a minimum value of the objective function.

In an aspect of the present invention, the performing of the controller training and controlling includes: performing controller training by using a collection of state-action trajectories; improving the controller by using the motion data and the displacement mapping; and controlling a transition between states of behaviors by using the controller.

According to another aspect of the present invention, there is provided a system for simulating a character, the system including: a motion data optimization unit optimizing motion data by using a displacement mapping and a PD control; and a character control unit performing controller training by using the optimized motion data and controlling a motion of the character.

According to the present invention, it is possible to provide a physically-simulated, two-dimensional biped character for imitating actual human behaviors by using a set of motion data recorded from behaviors repeatedly performed by an actual human, and correct the set of motion data via optimization so that the character being a simplified dynamic model may approximately reproduce recorded motion trajectories by actuating joints of the character while maintaining its balance.

Also, according to the present invention, it is possible to provide a biped character robustly imitating actual human behaviors by training a device controlling behaviors of the character by using a set of optimized motion data, and compose trained dynamic controllers into an integrated framework allowing the character to transition between different behaviors of the character.

Also, according to the present invention, it is possible to provide a biped character by which all controllers are trained, and which is dynamically simulated in real time and controlled interactively to perform motions desired by a user.

BEST MODE FOR CARRYING OUT THE INVENTION

Figure 1:
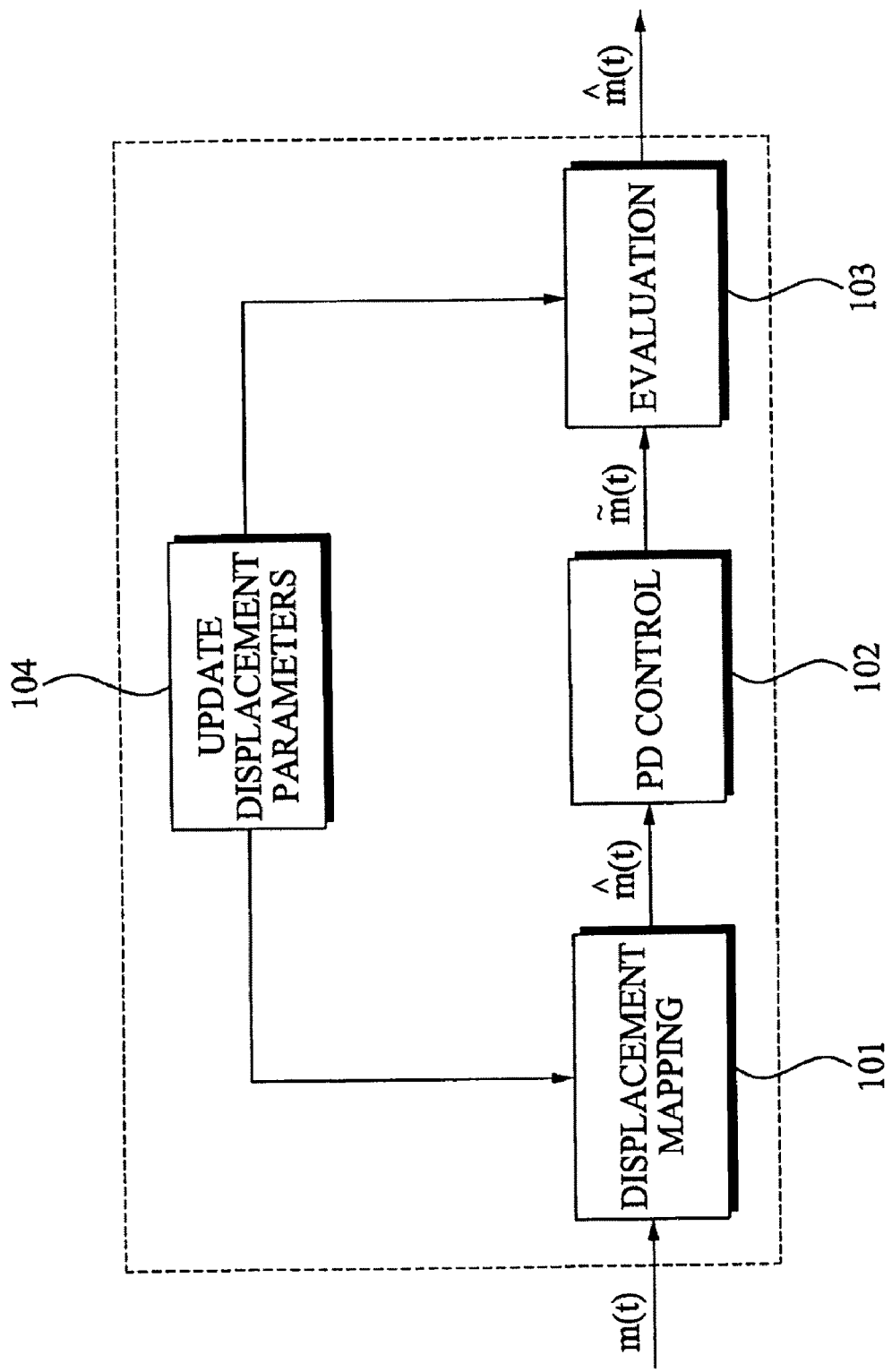
FIG. 1 is a diagram illustrating an overview of a system of optimizing motion data according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The present invention relates to a method and system for simulating a character which can learn behaviors of a dynamic model configured by a figure of a dot, a line, a side, a solid, and the like, especially, behaviors of a biped character among the dynamic models by using a set of motion data captured from human behaviors.

I. Optimization

A simple tracking method such as a Proportional Derivative (PD) control cannot form the dynamic model by using the recorded motion data since the dynamic model is physically different from an actual human skeleton. The dynamic model has fewer degrees of freedom and consists of rigid links and ideal revolute joints, whereas an actual human has deformable muscles, skin, and complicated joints.

Since measuring a precise mass and inertia of each body segment of the actual human is very difficult, physical properties of the dynamic model are determined somewhat arbitrarily based on statistical data. Physical imprecision of the dynamic model is a major hindrance in learning dynamic behaviors from captured motion data.

Accordingly, optimization may be performed by correcting the motion data in order to compensate for the inherent imprecision of the dynamic model. Specifically, when a segment of the motion data is provided, the motion data may be optimized to allow the biped dynamic model to track a motion corresponding to the segment of the motion data while maintaining its balance. However, the optimization has problems of high-dimensionality of an optimization area and highly non-linear objective functions.

Also, since the dynamic model cannot sufficiently keep moving along desired trajectories when the dynamic model loses its balance due to a lack of feedback control, when a foot inadvertently touches a ground surface, and when an external force such as thrusts is provided, the dynamic model usually fails to track target motions.

The above-described problems can be easily solved by slightly modifying the target motions. For example, balance control can be achieved by a slight tilt of the upper body, accidental ground contact can be avoided by lifting up a foot trajectory, and strong thrusts can be produced by stretching out the stance foot further when the foot pushes down against the ground.

A method and system for simulating a character according to the present invention enables the dynamic model to track the motion by improving the target motion kinematically with respect to the above-described problem via an optimization algorithm.

FIG. 1 is a diagram illustrating an overview of a system of optimizing motion data according to an exemplary embodiment of the present invention.

When input motion m(t) is equivalent to $(\theta_1(t), \ldots, \theta_n(t))$, a system for simulating a character may represent a corrected target motion $\hat{m}(t)$ by using a displacement mapping 101 of a motion in accordance with Equation 1. In this instance, t denotes a predetermined time, and n denotes a number of joints of a biped character. Specifically, $(\theta_1(t), \ldots, \theta_n(t))$ denotes an array of angles which joints have during time t.

$$\hat{m}(t)=m(t)+d(t),$$ [Equation 1]

where d(t) denotes an array of motion displacements equivalent to $(d_1(t), \ldots, d_n(t))$. In this instance, the array of motion displacements may be generated by using a displacement parameter. Also, each motion displacement may be represented in a parametric form with a bell-shaped basis function in accordance with Equation 2:

$$d_i(t) = \sum_{j=1}^{m} h_{ij} B_j(t; c_j, w_j),$$ [Equation 2]

where m denotes a number of node points, and $B_j(t; c_j, w_j)$ denotes a sinusoidal basis function in accordance with Equation 3:

$$B_j(t; c_j, w_j) = \begin{cases} \frac{1}{2}\left[1 + \cos\left(\frac{\pi}{w_j}(t - c_j)\right)\right], & \text{if } c_j - w_j < t < c_j + w_j \\ 0, & \text{otherwise.} \end{cases}$$ [Equation 3]

Specifically, the sinusoidal basis function has a value extending from $c_j-w_j$ to $c_j+w_j$, and has a value of 0 outside the above-described section. Also, the sinusoidal basis function has a peak at node point $c_j$. In this instance, optimization performance may be significantly improved according to a selection location of node points in a time axis.

Figure 2:
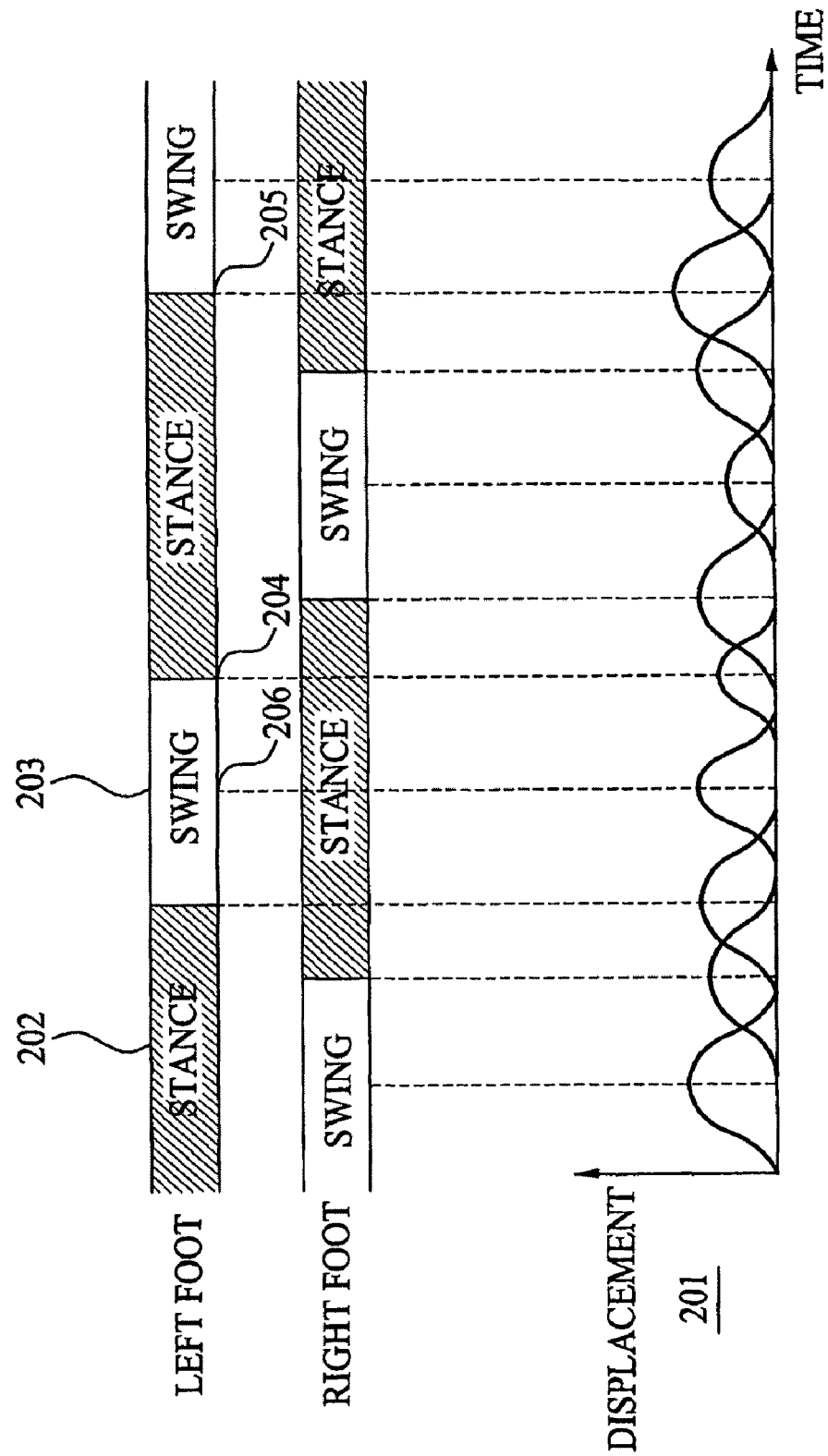
FIG. 2 illustrates a displacement mapping according to an exemplary embodiment of the present invention.

FIG. 2 illustrates a displacement mapping according to an exemplary embodiment of the present invention.

The motion displacement is represented as a weighted sum of sinusoidal basis functions in accordance with above-described Equation 2. In this instance, the sinusoidal basis functions are distributed along a time axis synchronized with a stance phase 202 and a swing phase 203 as illustrated in a graph 201. Also, an m-number of node points $\{c_1, \ldots, c_m\}$ are non-uniformly spaced, and each node point is coincident either with a takeoff point 204 and a kickdown point 205 of the stance phase 202 or with a halfway point 206 of the swing phase 203.

Here, the system for simulating the character takes m(t) as input for the displacement mapping 101, and determines a set of coefficients $(h_{11}, \ldots, h_{nm}, w_1, \ldots, w_m)$ of the motion displacements in accordance with above-described Equation 3. Also, the calculated displacement applies m(t) in accordance with above-described Equation 1.

The system for simulating the character iteratively updates the coefficients of motion displacements as displacement parameters 104 of the motion, and proposes the target motion at every step of the iteration. In this instance, the system for simulating the character may track the target motion starting from a first frame of an input motion by using a PD control 102. In this case, a control equation for each joint of the character is in accordance with Equation 4:

$$\tau = k_s(\theta_d - \theta) + k_v(\dot{\theta}_d - \dot{\theta}),$$ [Equation 4]

where $\theta$ denotes an angle of a joint, $\theta_d$ denotes a desired angle, $\dot{\theta}$ denotes an angular velocity of a joint, and $\dot{\theta}_d$ denotes a desired angular velocity. Also, $k_s$ and $k_v$ denote a proportional gain and a derivative gain.

The system for simulating the character may produce a simulated motion $\tilde{m}(t)$ using the PD control by tracking the target motion. In this instance, the simulated motion may be evaluated 103 and outputted, or may be used for updating displacement parameters 104. The displacement parameter may be used for the displacement mapping 101 of an input motion of a subsequent time instance. Also, tracking the target motion may use PD servos.

The system for simulating the character enables an objective function in accordance with Equation 5 to have a minimum value so that the simulated motion may imitate the input motion as closely as possible:

$$E = \int_0^T \left( \left( \frac{t}{T} \right)^2 + c \right) \text{diff}(m(t), \tilde{m}(t)) \, dt.$$ [Equation 5]

Specifically, the objective function may be a function which penalizes the discrepancy between the input motion and the simulated motion, and enables the simulated motion to imitate the input motion as closely as possible by minimizing the value of the objective function. In this instance, diff $(m(t), \tilde{m}(t))$ denotes a difference between two poses which the biped character has according to the input motion and the simulated motion, and is measured by comparing mass points on a skeleton in the two poses.

For this, the system for simulating the character may use internal joint positions and end points of body links for distance computation. Specifically, two sets of points obtained from the input motion and the simulated motion are first normalized and have the same average in x-coordinates. In this instance, a difference between the two sets of points is computed as the squared sum of Euclidean point distances. Weight term $((t/T)^2 + c)$ allows the optimized motion to follow a target trajectory at the end of the motion well.

Figure 3:
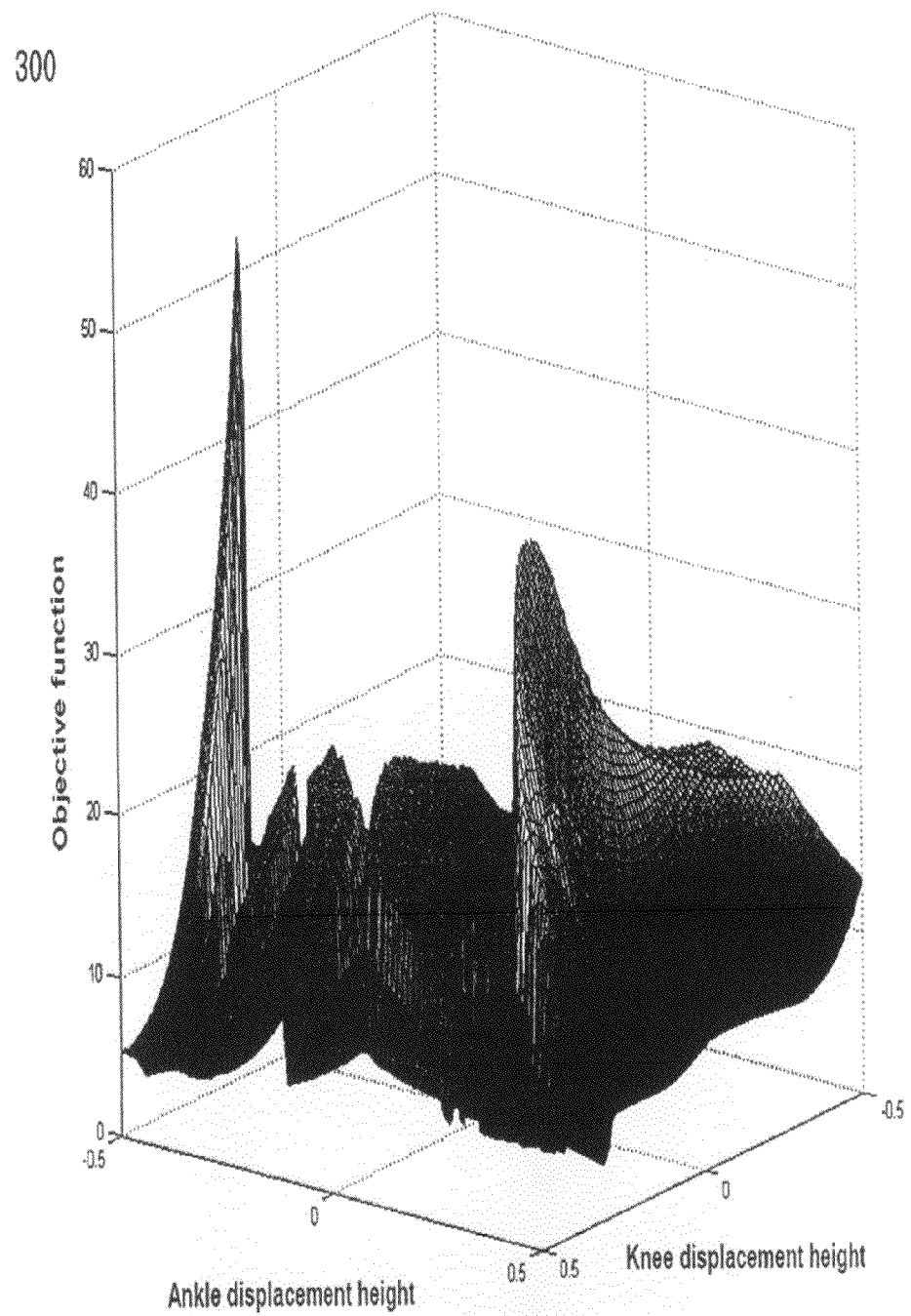
FIG. 3 illustrates an exemplary sampling of an objective function with respect to varied displacement parameters according to an exemplary embodiment of the present invention.

FIG. 3 illustrates an exemplary sampling of an objective function with respect to varied displacement parameters according to an exemplary embodiment of the present invention.

The objective function optimizing motion data has many local minima. A graph 300 shows a sampling of the objective function as two of the displacement parameters are varied, and the displacement parameters correspond to an ankle displacement height and a knee displacements height. In this instance, the optimization is difficult due to narrow and steep valleys in the objective function.

Specifically, in order to find the minimum of the objective function, the system for simulating the character may randomly select initial values of the displacement parameters and repeatedly operate a downhill simplex method with respect to different initial values of the displacement parameters to find a local extremum. In this instance, the system for simulating the character may select a minimum value of local extremum values as the minimum value of the objective function.

The downhill simplex method is very slow, however, the downhill simplex method is extremely robust in some cases. Even though an exemplary embodiment of the present invention uses the downhill simplex method for optimization of the motion data, this is simply provided for comprehensive understanding of the present invention. The present invention is not limited to the above-described exemplary embodiments, and it would be appreciated by those skilled in the art that various modification and changes may be made to these embodiments from the above description. For example, other well-known optimization methods such as Powell's method and a conjugate gradient method may be used.

The system for simulating the character may record motion data in long clips in order to capture natural transitions between behaviors. The optimization process may be very slow and prone to diverge with a long segment of the motion data because dimensionality of a search space increases in proportion to a number of nodes sampled in the time axis.

For this, a concept of space-time windows may be used. Specifically, the system for simulating the character uses an incremental technique for efficiently correcting a long clip of the motion data. A basic idea is to separate optimization frames in a window which covers a small portion of a long sequence.

In this instance, the window shifts along the time axis in order to allow motion frames to be corrected incrementally from the start to the end of the motion. More specifically, a size of the window is initially determined, and the window covers the support intervals of the first k-number basis functions. Once the motion frames in the window are optimized, the window is shifted by dropping the first k−1-number basis functions and including k−1-number successive basis functions. By using the above-described method, the shifted window has an overlap with the previous window in order to maintain temporal coherence across the window boundaries.

The entire optimization process corrects the motion frames in the window and repeatedly shifts the window until the window arrives at the end of the motion frames.

Since finding an optimal solution of the above-described variable optimization problem is extremely demanding computationally, a couple of pragmatic techniques to accelerate the optimization process may be used. Reducing a dimension of the search space is a common idea of practical optimization techniques.

According to a first technique, the joints in the upper body are controlled by PD servos, however, the joints do not actively adjust the target trajectories to keep balance. For this, the system for simulating the character excludes degrees of freedom in the upper body from the displacement parameters for optimization.

Another technique reduces a total number of iteration steps by selecting promising initial values. The entire optimization process starts at different initial values of parameters. Accordingly, previously establishing only a few promising initial values from among the initial values may be considered. Specifically, all the initial values need not be calculated in a local optimization method, and a few predetermined initial values may be selected.

By using the above-described method, the system for simulating the character may achieve significant performance gain without noticeable deterioration in a final result.

II. Behavior Control

The system for simulating the character may generate a biped character, and the character may have an integrated motor skill which is dynamically-simulated, and controllable in real-time by a user. For this, the character may learn a motor control of behaviors such as walking, jumping, and balancing, and a set of motion data may be adapted for the character.

Figure 4:
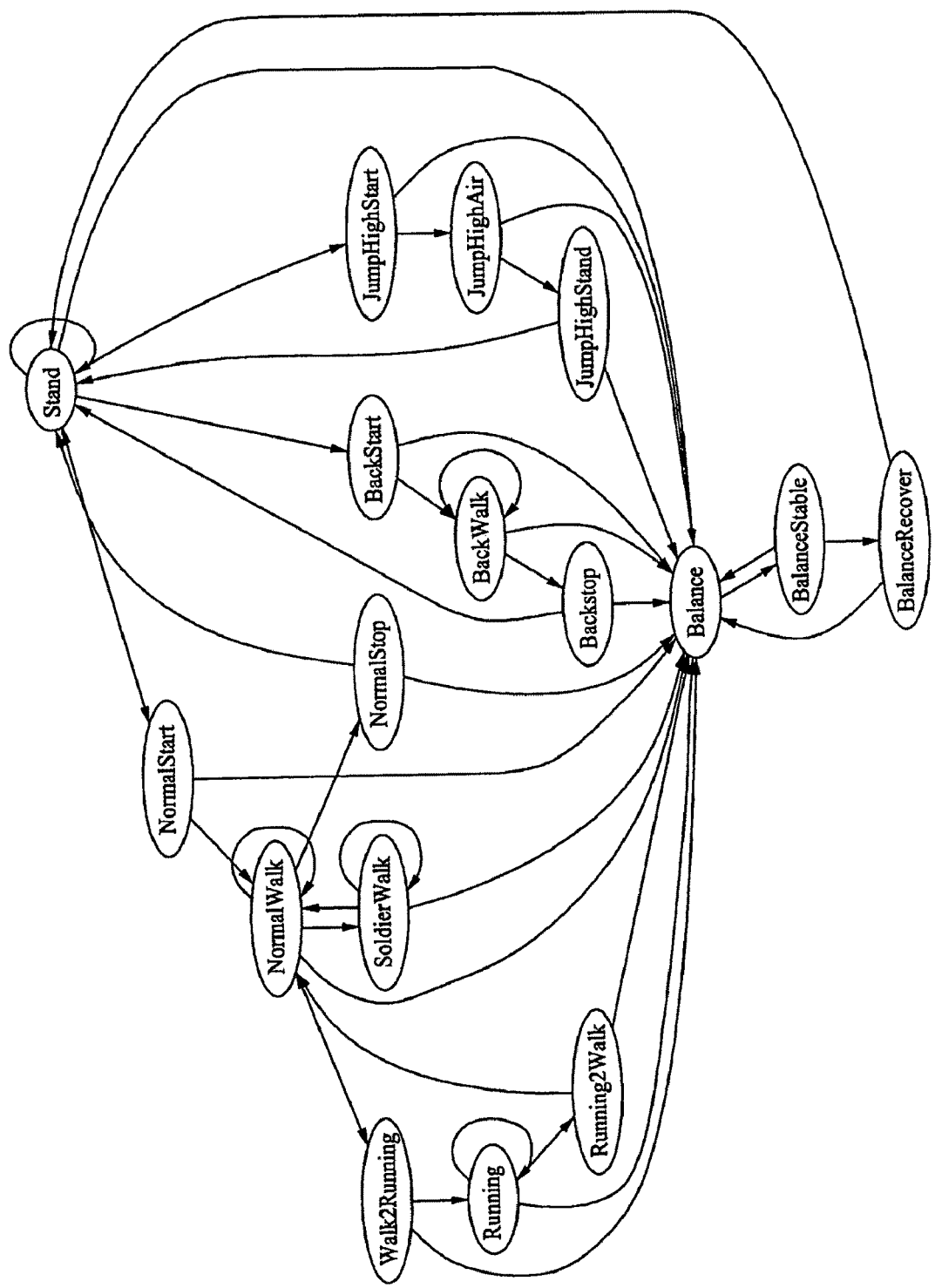
FIG. 4 illustrates an example of finite state machines which govern transitioning between controllers according to an exemplary embodiment of the present invention.

Motor controllers for the motor control are integrated into a finite state machine which allows both voluntary and involuntary transitioning between controllers. FIG. 4 illustrates an example of finite state machines which govern transitioning between controllers according to an exemplary embodiment of the present invention. FIG. 4 illustrates finite state machines including a plurality of nodes which respectively corresponds to the controllers, and a plurality of edges which shows transition possibilities between the controllers.

A user can control the character by specifying a transition to a desired action of the character or directly applying an external force to the character. For example, transitioning to a balance controller is involuntarily invoked when the character loses its balance due to the external force.

The controllers may be categorized into two types, that is, a stationary controller and a transition controller. First, the stationary controller has a finite region of a state space. In this instance, actuation of the stationary controller in the state space allows the character's state to change within the region when no explicit perturbation is deliberately introduced. Specifically, the stationary controller learns either a stationary behavior such as balancing upright or a periodic behavior such as walking and jogging. Also, the transition controller produces transition motions from one behavior to another behavior. For example, a start-to-walk controller and a walk-to-stop controller generate transitions between an upright standing position and dynamic walking.

1. Controller Training

The controller training is a process of inferring a required action for any predetermined state from observation of actual human motions. In this instance, the observation is stored as a collection of state-action trajectories. Each state-action pair describes how the actual human moves in a pose at time $t+\Delta t$ in a state at time t.

Also, the controller can be considered as a function which takes the state of the character as input and produces a target pose of the character at the subsequent time instance. The output pose is transmitted to PD servos to actuate the character. In this instance, when any novel state of the character is provided, a simple regression technique which selects nearby samples in the state space and combines the output poses with the samples to produce a desired pose may be used.

A distance between motion frames is required to be measured in order to select the nearest samples, and features of the motion frames is required to be considered in order to measure the distance between motion frames.

1) Joint angles: The differences in all of the joint angles are considered for distance computation, and are included in feature vector. For example, when the dynamic model has five joints in the upper body and six joints in the lower body, the joints in the upper body weigh less than the lower body, or are sometimes ignored, since the upper body makes a smaller contribution to balancing biped motions than the lower body does.

2) Root position, velocity, and direction: A height of a root node (where a spine link meets two thigh links) from a ground plane, and horizontal and vertical velocities of the root node are included in the feature vector. However, a horizontal coordinate of the root node is ignored since the distance between frames can be invariant under horizontal movement. The signed direction of the spine link with respect to an upright position of the spine link is also included in the feature vector.

3) Foot position and velocity: The feature vector includes the position and velocity of both feet with respect to a local, moving coordinate system. An origin of the coordinate system is fixed at the root node and the direction of the spine link defines the coordinate axes. The foot positions already have sufficient information since the root position and the joint angles already reflect the foot positions. However, foot position and velocity may be included in the feature vector in order to adjust weights with respect to other features.

4) Ground contact: Contact with an environment is an important perceptual feature of the motion. Features of the ground contact may be described by using an array of Boolean features. For bipedal motions, the feature vector includes four Boolean values for encoding heel and toe contacts of both feet. The recovery motion from falling over requires more Boolean features.

The system for simulating the character may compute the distance between motion frames by using various calculations such as weighting, squaring, and summing the four features.

When a feature vector F(t) of the character being simulated is provided, the controller decides the target pose $P(t+\Delta t)$ at the subsequent time instance for a regression of training data. In this instance, the controller searches the k-number nearest adjacent samples $\{(F_i,P_i)|i=1, \ldots, k\}$ and combines the associated poses in the samples with weights inversely proportional to the distances. In this instance, the target pose is in accordance with Equation 6:

$$P(t + \Delta t) = \begin{cases} \dfrac{\sum_i w_i P_i}{\sum_i w_i}, & \text{if } d_i > \varepsilon \text{ for } \forall i, \\ P_{argmin(d_i)}, & \text{otherwise,} \end{cases} \quad \text{[Equation 6]}$$

where $d_i$ denotes distance $(F(t),F_i)$ a distance between a current state of a character and an i-th sample $F_i$ of samples is calculated by using a feature vector F(t), $w_i$ denotes $1/d_i$, and $\varepsilon$ denotes a predetermined constant. In this instance, the system for simulating the character may select the nearest sample in order to avoid division by zero when the distance to any sample is less than or equal to $\varepsilon$.

Figure 5:
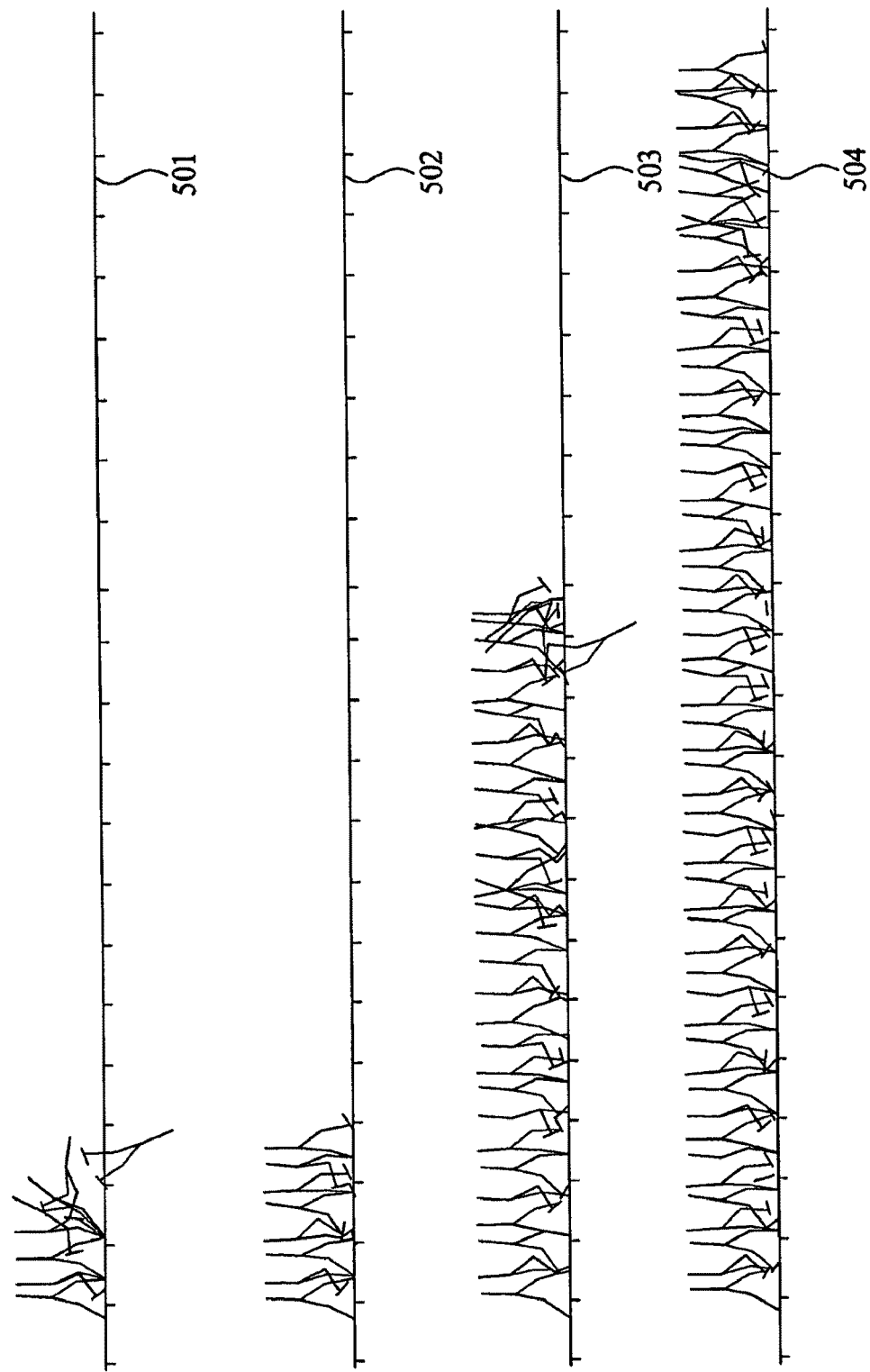
FIG. 5 illustrates an example of training walk controllers according to an exemplary embodiment of the present invention.

FIG. 5 illustrates an example of training walk controllers according to an exemplary embodiment of the present invention. In a first row 501, original motion data are kinematically again targeted to the two-dimensional dynamic model and are transmitted to PD servos to simulate. However, the character falls over in a few steps. In a second row 502, the motion data are optimized not to fall over. In a third row 503, the walk controller is trained from a set of walking motion data for 30 seconds by using a simple regression technique without adaptive improvement. In this instance, the character walks stably for an extended period of time, however, the character eventually falls over. Lastly, in a fourth row 504, the walk controller allows walk cycles to repeat indefinitely over a flat terrain without falling over.

Specifically, the walk controller illustrated in the third row 503 provides no guarantee that the walk controller will produce stationary cycles without falling over. The performance of the controller depends significantly on the diversity and distribution of training data as the motion data. However, it is very difficult to acquire the training data that guarantees the desired quality of the controller.

2. Controller Improvement

In order to solve the above-described problem, adaptively improving the controller is required. A basic strategy is to test the controller by operating the controller on a simulator. When the character falls over or deviates excessively from the training data set, a new state-action trajectory may be added to the training data set so that the character can avoid an unsuccessful situation.

Specifically, an abnormal situation possibly leading to falling over during simulation can be detected by monitoring the distance to the nearest sample in the training data set. When the distance between the character's state and the nearest adjacent sample in the training data is greater than or equal to a user-specified threshold for a certain period of time, it may be decided that the character's state is unrecoverable to stable cycles using the current controller.

Once the unsuccessful situation is detected, an entire system may be rolled back in time to the moment when the nearest cycle of motion begins in order to avoid the unsuccessful situation. To do so, a new sample trajectory may be synthesized by warping existing training data. Specifically, the system for simulating the character may select a cycle of the motion which starts with the configuration nearest to the character's current state from the training data set. This motion trajectory is warped kinematically and the warped motion starts with the character's current state. In this instance, the warped motion blends smoothly back to the character's original trajectory. In this instance, blending the warped motion back to the character's original trajectory may use the displacement mapping 101 illustrated in FIG. 1.

The system for simulating the character may operate the above-described optimization process to make the warped trajectory physically-feasible, and then add the new trajectory back to the training data set. The trajectory newly added to the training data set guides the character back to a stable cycle at a regression process. By using the above-described method, the system for simulating the character may incrementally improve the controller until no more failures are generated.

3. Transition Control

When two stationary (or cyclic) controllers are provided, the system for simulating the character may use a transition controller between the stationary controllers. In this instance, the transition controller may be used in the same way as using the stationary controllers when an adequate training data set is available.

For example, the character starting to walk from an upright standing position, taking six steps, and stopping to the standing position is repeatedly captured. In this instance, the first and the last two steps of the walk motion data may be respectively used to train stand-to-walk and walk-to-stand transition controllers.

The walk cycle transition controller may be trained from the intermediate two steps. However, acquiring a large collection of transitioning motions between every pair of simulated behaviors is very tedious and laborious.

In the case of lacking adequate training data, the training data may be synthesized by blending existing motions kinematically. For example, a walk-to-run transition sample can be synthesized by blending a cycle of a walking motion and a cycle of a running motion. Specifically, two cycles may be simply blended by fading one cycle in while fading another cycle out.

Over the fading duration, the system for simulating the character finds correspondence between two motions, and smoothly blends joint angles by using a sinusoidal transition function. Since joint angle blending may cause feet to slide, the system for simulating the character enforces foot contact constraints using hierarchical displacement mapping.

Transition control in real-time is simple. When it is assumed that the character is controlled by a stationary controller and the character's behavior is changed via a transition controller, the distance between the character's current state and the nearest sample in the transition controller's training data set is checked while being simulated. When the distance is less than or equal to a certain threshold, the transition controller controls the character. Transitioning from the transition controller to the stationary controller can be handled relatively simply. However, the transition may fail when the training data set included in the transition controller is insufficient. Whenever a failure is detected, the transition controller can be improved via a controller improvement process as described above.

Figure 6:
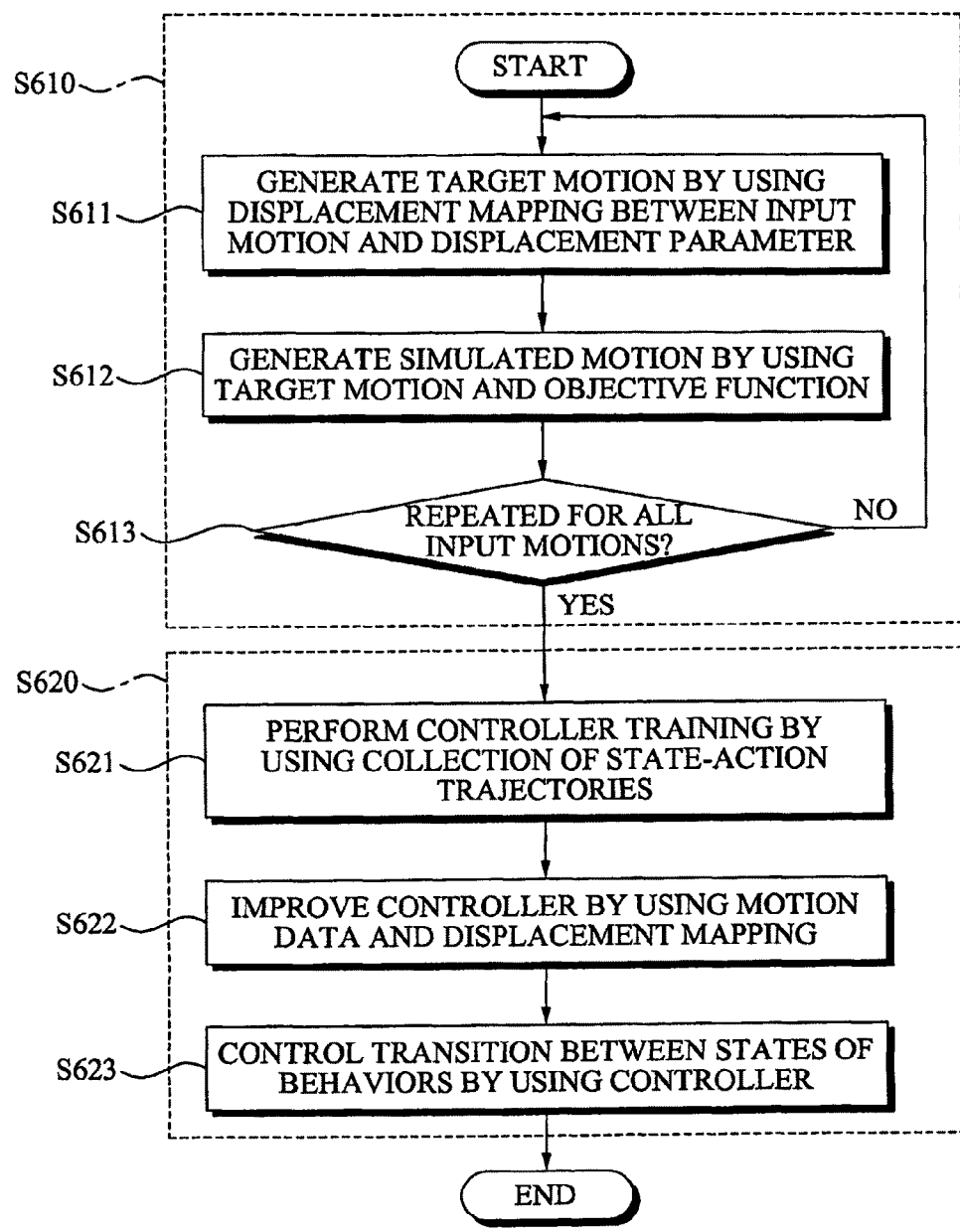
FIG. 6 is a flowchart illustrating a method of simulating a character according to an exemplary embodiment of the present invention.

FIG. 6 is a flowchart illustrating a method of simulating a character according to an exemplary embodiment of the present invention.

In operation S610, the system for simulating the character optimizes motion data by using a displacement mapping and a PD control. In this instance, operation S610 may include operations S611 through S613 as illustrated in FIG. 6.

In operation S611, the system for simulating the character generates a target motion by using the displacement mapping between an input motion and a displacement parameter. In this instance, the system for simulating the character may generate the target motion by adding, to the input motion, an array of motion displacements generated by the displacement parameter. Specifically, each element of the array of motion displacements is calculated by using a bell-shaped basis function in accordance with the above-described Equation 2, and the system for simulating the character generates the target motion by adding, to the input motion, the array of motion displacements in accordance with the above-described Equation 1.

Also, the input motion m(t) is in accordance with Equation 7:

$$m(t)=(\theta_1(t),\ldots,\theta_n(t)),\qquad\text{[Equation 7]}$$

where n denotes a number of joints of a character, and $\theta(t)$ denotes an angle which a joint has during time t, and the array of motion displacements d(t) is in accordance with Equation 8:

$$d(t)=d_1(t),\ldots,d_n(t)).\qquad\text{[Equation 8]}$$

The array of motion displacements is optimized by using a window moving according to a time axis when a predetermined number of basis functions is overlapped. In this instance, the window covers a portion of a sequence for a long clip of the motion data, and separates an optimization motion frame.

In operation S612, the system for simulating the character generates a simulated motion by using the target motion and an objective function. In this instance, the system for simulating the character selects an initial value of the displacement parameter, repeatedly finds a local extremum of different initial values of displacement parameters, and calculates the simulated motion by establishing a minimum value of local extremum values as a minimum value of the objective function.

The objective function is in accordance with above-described Equation 5, and the local extremum is established by using a predetermined optimization method. In this instance, the optimization method may use any one of a downhill simplex method, Powell's method, and a conjugate gradient method.

In operation S613, the system for simulating the character repeatedly performs operation S611 and operation S612 for all input motions included in the motion data. Specifically, the motion data may be a set of motions of the character, and the system for simulating the character may sequentially optimize the motions as the input motion.

Figure 7:
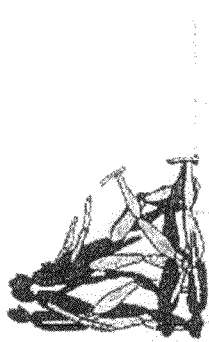
FIG. 7 illustrates an exemplary result of an optimized motion according to an exemplary embodiment of the present invention.
Figure 7:
Figure 7:
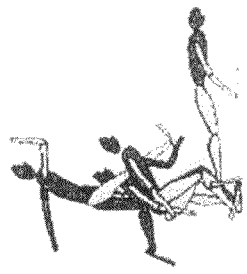
Figure 7:
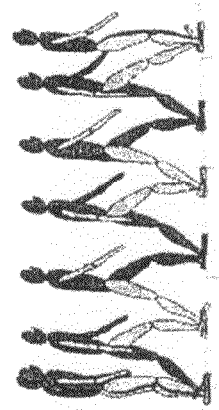
Figure 7:
Figure 7:
Figure 7:
Figure 7:
Figure 7:

FIG. 7 illustrates an exemplary result of an optimized motion according to an exemplary embodiment of the present invention. A left column 701 illustrates a form captured by using a motion capture, a center column 702 illustrates a form simulated by using optimized motion data, and a right column 703 illustrates a form simulated by using original motion data. In this instance, forms of the right column 703 illustrate most of the data result in falling down. However, it is understood that forms of the center column 702 simulated by using the optimized motion data are similar to the form captured by using the motion capture. FIG. 7 respectively illustrates walking, running, and jumping of the character from top to bottom.

In operation S620, the system for simulating the character performs controller training by using the optimized motion data and controls a motion of the character. As illustrated in FIG. 6, operation S620 may include operations S621 through 5623.

In operation S621, the system for simulating the character performs controller training by using a collection of state-action trajectories.

The system for simulating the character may select samples near a novel state from a training data set when the novel state of the character is provided, and calculate a target pose by combining output poses included in the samples using regression.

In this case, the nearby sample is selected by using a distance between motion frames, and the distance between motion frames is measured by using features of the motion frames. The features of the motion frames include at least one of (1) a joint angle, (2) a position, a velocity, and a direction of a root node, (3) a position and a velocity of character feet, and (4) a ground contact. Specifically, the system for simulating the character may calculate the distance between motion frames by using the features of the motion frames and above-described Equation 6.

In operation S622, the system for simulating the character improves the controller by using the motion data and the displacement mapping. Here, the system for simulating the character first monitors a trajectory of the character by using a training data set included in the motion data. The system for simulating the character recognizes an unsuccessful situation of when the trajectory of the character deviates from a trajectory according to the training data set at an amount greater than a predetermined standard during the monitoring, and rolls back an entire system to a nearest cycle of a motion of the character when recognizing the unsuccessful situation.

Also, the system for simulating the character may improve the controller adding a new state-action trajectory to the training data set, and blending the state-action trajectory with an original trajectory by using the displacement mapping.

Figure 8:
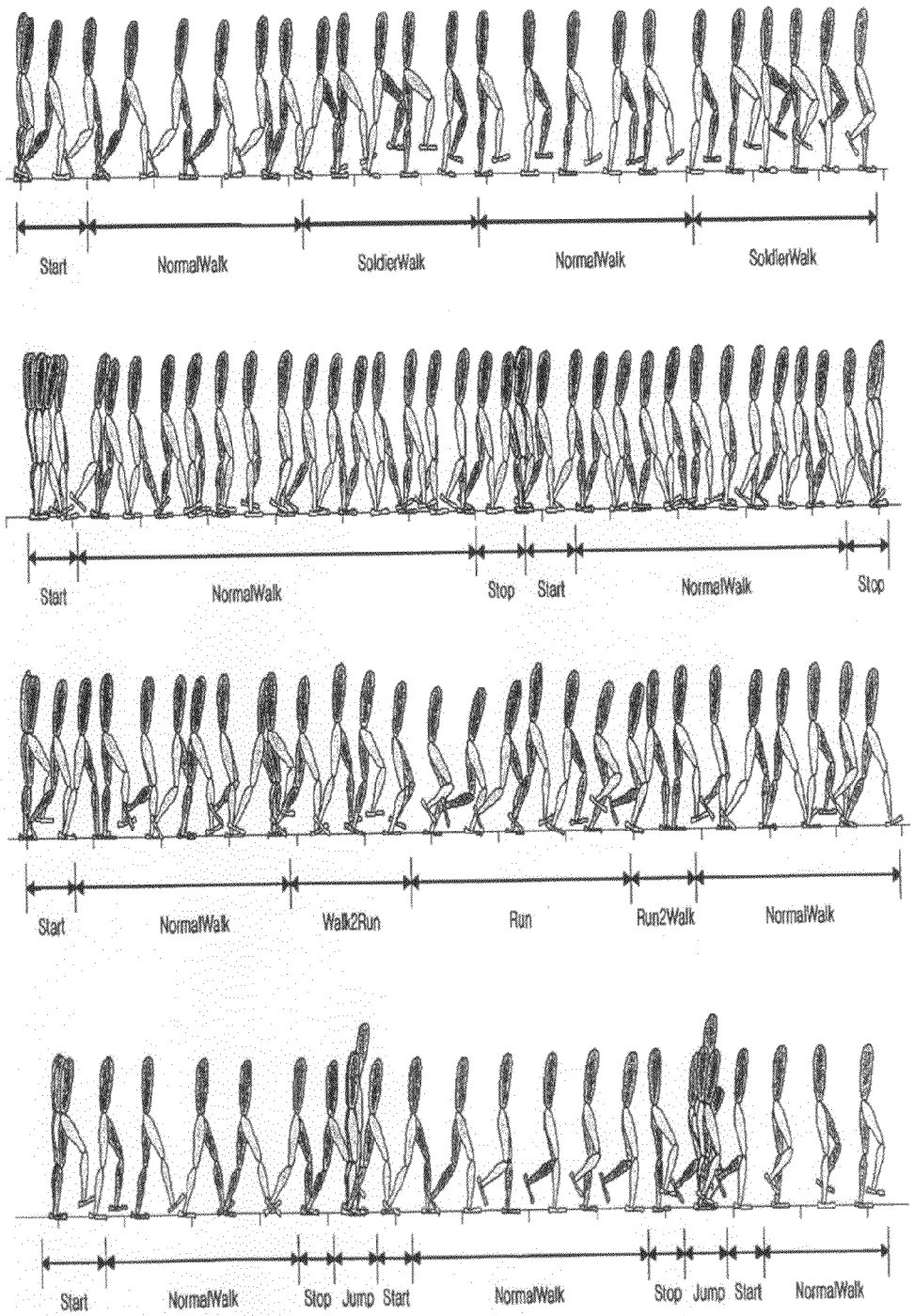
FIG. 8 illustrates an example of transitioning between controllers according to an exemplary embodiment of the present invention.

In operation S623, the system for simulating the character controls a transition between states of behaviors by using the controller. The controller includes a stationary controller controlling a change of the state of the character in a predetermined range, and a transition controller controlling a transition between stationary controllers. Specifically, the system for simulating the character may control the motion of the character in order to control the transition between states when a distance between the current state of the character and the nearest sample of samples included in the training data set of the transition controller while simulating the character is measured, and the distance is less than or equal to a threshold established by a user. FIG. 8 illustrates an example of transitioning between controllers according to an exemplary embodiment of the present invention.

Figure 9:
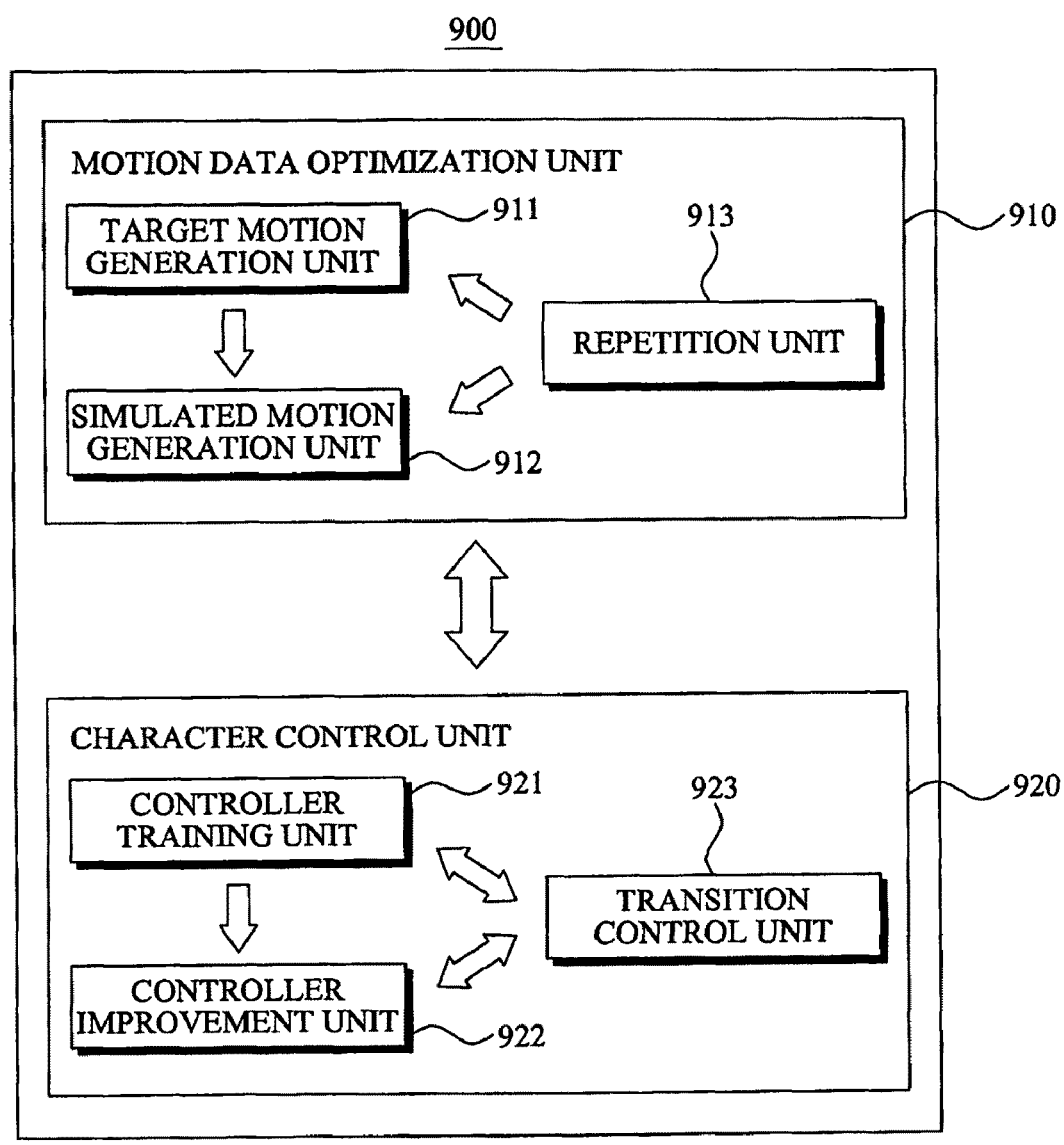
FIG. 9 is a block diagram illustrating an internal configuration of a system for simulating a character according to an exemplary embodiment of the present invention.

FIG. 9 is a block diagram illustrating an internal configuration of a system 900 for simulating a character according to an exemplary embodiment of the present invention. As illustrated in FIG. 9, the system 900 for simulating the character includes a motion data optimization unit 910 and a character control unit 920.

The motion data optimization unit 910 optimizes motion data by using a displacement mapping and a PD control. In this instance, the motion data optimization unit 910 may include a target motion generation unit 911, a simulated motion generation unit 912, and a repetition unit 913, as illustrated in FIG. 9, in order to optimize the motion data.

The target motion generation unit 911 generates a target motion by using the displacement mapping between an input motion and a displacement parameter. In this instance, the target motion generation unit 911 may generate the target motion by adding, to the input motion, an array of motion displacements generated by the displacement parameter. Specifically, each element of the array of motion displacements is calculated by using a bell-shaped basis function in accordance with the above-described Equation 2, and the target motion generation unit 911 generates the target motion by adding, to the input motion, the array of motion displacements in accordance with the above-described Equation 1.

Also, the input motion $m(t)$ is in accordance with the above-described Equation 7, and the array of motion displacements $d(t)$ is in accordance with the above-described Equation 8.

The array of motion displacements is optimized by using a window moving according to a time axis when a predetermined number of basis functions is overlapped. In this instance, the window covers a portion of a sequence for a long clip of the motion data, and separates an optimization motion frame.

The simulated motion generation unit 912 generates a simulated motion by using the target motion and an objective function. In this instance, the simulated motion generation unit 912 selects an initial value of the displacement parameter, repeatedly finds a local extremum of different initial values of displacement parameters, and calculates the simulated motion by establishing a minimum value of local extremum values as a minimum value of the objective function.

The objective function is in accordance with the above-described Equation 5, and the local extremum is established by using a predetermined optimization method. In this instance, the optimization method may use any one of a downhill simplex method, Powell's method, and a conjugate gradient method.

The repetition unit 913 repeatedly performs operation S611 and operation S612 for all input motions included in the motion data. Specifically, the motion data may be a set of motions of the character, and the system 900 for simulating the character may sequentially optimize the motions as the input motion by using the motion data.

The character control unit 920 performs controller training by using the optimized motion data and controls a motion of the character. In this instance, the character control unit 920 may include a controller training unit 921, a controller improvement unit 922, and a transition control unit 923, as illustrated in FIG. 9, in order to control the motion of the character.

The controller training unit 921 performs controller training by using a collection of state-action trajectories. The controller training unit 921 checks a state of the character according to a target pose inputted at a subsequent time instance and checks output poses. The controller training unit 921 may select nearby samples in a state space when the novel state of the character is provided, and combine the output poses.

In this case, the nearby sample is selected by using a distance between motion frames, and the distance between motion frames is measured by using a feature of the motion frames. The features of the motion frames include at least one of (1) a joint angle, (2) a position, a velocity, and a direction of a root node, (3) a position and a velocity of character feet, and (4) a ground contact. Specifically, the system for simulating the character may calculate the distance between motion frames by using the features of the motion frames and the above-described Equation 6.

The controller improvement unit 922 improves the controller by using the motion data and the displacement mapping. Here, the controller improvement unit 922 first monitors a trajectory of the character by using a training data set included in the motion data. The controller improvement unit 922 recognizes an unsuccessful situation of when the trajectory of the character leaves a trajectory according to the training data set at an amount greater than a predetermined standard during the monitoring, and rolls back an entire system to a nearest cycle of a motion of the character when recognizing the unsuccessful situation.

Also, the controller improvement unit 922 may improve the controller adding a new state-action trajectory to the training data set, and blending the state-action trajectory with an original trajectory by using the displacement mapping.

The transition control unit 923 controls a transition between states of behaviors by using the controller. The controller includes a stationary controller controlling a change of the state of the character in a predetermined range, and a transition controller controlling a transition between stationary controllers. Specifically, the transition control unit 923 may control the motion of the character in order to control the transition between states when a distance between the current state of the character and the nearest sample of samples included in the training data set of the transition controller while simulating the character is measured, and the distance is less than or equal to a threshold established by a user.

As described above, the method and system for simulating the character according to the above-described exemplary embodiments of the present invention may provide a physically-simulated, two-dimensional biped character for imitating actual human behaviors by using a set of motion data recorded from behaviors repeatedly performed by an actual human, and correct the set of motion data via optimization so that the character being a simplified dynamic model may approximately reproduce recorded motion trajectories by actuating joints of the character while maintaining its balance.

Also, the method and system for simulating the character according to the above-described exemplary embodiments of the present invention may provide a biped character robustly imitating actual human behaviors by training a device controlling behaviors of the character by using a set of optimized motion data, and compose trained dynamic controllers into an integrated framework allowing the character to transition between different behaviors of the character.

Also, the method and system for simulating the character according to the above-described exemplary embodiments of the present invention may provide a biped character by which all controllers are trained, and which is dynamically simulated in real time and controlled interactively to perform motions desired by a user.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of using a non-transitory computer readable medium for storing instructions which when executed by a computer processor causes the computer to perform a method of simulating a character, the method comprising:

optimizing recorded motion data captured from human behavior using a displacement mapping and a Proportional Derivative (PD) control; and performing controller training using the optimized motion data and controlling a motion of the character, wherein the performing of the controller training and controlling comprises:

performing controller training using a collection of state-action trajectories;

improving the controller by using the motion data and the displacement mapping; and controlling a transition between states of behaviors by using the controller, and wherein the performing of the controller training using the collection of state-action trajectories comprises:

selecting at least one sample near a novel state when the novel state of the character is provided; and calculating a target pose by combining at least one output pose included in the at least one sample.

2. The method of claim 1, wherein the optimizing comprises:

generating a target motion by using the displacement mapping between an input motion and a displacement parameter; and generating a simulated motion by using the target motion and an objective function.

3. The method of claim 2, wherein the motion data includes a plurality of input motions separated by time, and the optimizing further comprises:

repeatedly performing the generating of the target motion and the generating of the simulated motion for all input motions included in the motion data.

4. The method of claim 2, wherein the generating of the target motion is a step of generating the target motion by adding, to the input motion, an array of motion displacements generated by the displacement parameter, and each element of the array of motion displacements is calculated by using a bell-shaped basis function.

5. The method of claim 4, wherein the generating of the target motion by adding, to the input motion, the array of motion displacements generated by the displacement parameter generates the target motion by adding, to the input motion, the array of motion displacements in accordance with Equation 9:

$$\tilde{m}(t)=m(t)+d(t),\quad\text{[Equation 9]}$$

where t denotes a predetermined time, and $\tilde{m}(t)$, $m(t)$, and $d(t)$ respectively denote a target motion, an input motion, and an array of motion displacements.

6. The method of claim 5, wherein the input motion is in accordance with Equation 10:

$$m(t)=(\theta_1(t),\ldots,\theta_n(t)),\quad\text{[Equation 10]}$$

where n denotes a number of joints of a character, and $\theta(t)$ denotes an angle which a joint has during time t, and the array of motion displacements is in accordance with Equation 11:

$$d(t)=(d_1(t),\ldots,d_n(t)).\quad\text{[Equation 11]}$$

7. The method of claim 5, wherein the bell-shaped basis function is in accordance with Equation 12:

$$d_i(t) = \sum_{j=1}^m h_{ij} B_j(t; c_j, w_j),\quad\text{[Equation 12]}$$

where $d_i(t)$ denotes an i-th element included in an array of motion displacements, $c_j$ denotes a node point, m denotes a number of node points, $h_{ij}$ and $w_j$ denotes a set of coefficients of motion displacements, and $B_j(t; c_j, w_j)$ denotes a sinusoidal basis function, and an m-number of node points $\{c_i,\ldots,c_m\}$ is non-uniformly spaced with respect a takeoff point and a kickdown point of a foot, and a halfway point of a swing phase.

8. The method of claim 7, wherein the sinusoidal basis function is in accordance with Equation 13:

$$B_j(t; c_j, w_j) = \begin{cases} \frac{1}{2}\left[1+\cos\left(\frac{\pi}{w_j}(t-c_j)\right)\right], & \text{if } c_j - w_j < t < c_j + w_j \\ 0, & \text{otherwise.} \end{cases}\quad\text{[Equation 13]}$$

9. The method of claim 2, wherein the generating of the simulated motion selects an initial value of the displacement parameter, repeatedly finds a local extremum of different initial values of displacement parameters, and calculates the simulated motion by establishing a minimum value of local extremum values as a minimum value of the objective function.

10. The method of claim 9, wherein the objective function is in accordance with Equation 14:

$$E = \int_0^T \left(\left(\frac{t}{T}\right)^2 + c\right) \text{diff}(m(t), \tilde{m}(t))\, dt,\quad\text{[Equation 14]}$$

where $m(t)$ and $\tilde{m}(t)$ respectively denote an input motion and a simulated motion, $((t/T)^2+c)$ denotes a weight term, and $(\text{diff}(m(t), \tilde{m}(t)))$ denotes a difference between two poses which a character has according to an input motion and a simulated motion, and the local extremum is established by using a predetermined optimization method.

11. The method of claim 10, wherein the optimization method is a downhill simplex method.

12. The method of claim 2, wherein the array of motion displacements is optimized by using a window moving according to a time axis when a predetermined number of basis functions is overlapped, and the window covers a portion of a sequence for a long clip of the motion data, and separates an optimization motion frame.

13. The method of claim 1, wherein the near sample is selected by using a distance between motion frames, and the distance between motion frames is measured by using features of the motion frames.

14. The method of claim 13, wherein the features of the motion frames include at least one of (1) a joint angle, (2) a position, a velocity, and a direction of a root node, (3) a position and a velocity of character feet, and (4) a ground contact, and the distance between motion frames is calculated by squaring, weighting, and summing differences between feature vectors $F(t)$ of the motion frames.

15. The method of claim 1, wherein the calculating calculates the target pose by using Equation 15:

$$P(t+\Delta t) = \begin{cases} \dfrac{\sum_i w_i P_i}{\sum_i w_i}, & \text{if } d_i > \varepsilon \text{ for } \forall\, i, \\ P_{argmin(d_i)}, & \text{otherwise,} \end{cases}\quad\text{[Equation 15]}$$

where $P(t+\Delta t)$ denotes a target pose of a subsequent time instance, $d_i$ denotes distance $(F(t), F_i)$ a distance between a current state of a character and an i-th sample $F_i$ of samples is calculated by using a feature vector F(t), $w_i$ denotes $1/d_i$, and $\epsilon$ denotes a predetermined constant.

16. The method of claim 1, wherein the improving comprises:
monitoring a trajectory of the character by using a training data set included in the motion data;
recognizing an unsuccessful situation of when the trajectory of the character deviates from a trajectory according to the training data set at an amount greater than a predetermined standard; and
rolling back an entire system to a nearest cycle of a motion of the character when recognizing the unsuccessful situation.

17. The method of claim 16, wherein the improving further comprises:
adding a new state-action trajectory to the training data set; and
blending the state-action trajectory with an original trajectory by using the displacement mapping.

18. The method of claim 1, wherein the controller includes a stationary controller controlling a change of the state of the character in a predetermined range, and a transition controller controlling a transition between stationary controllers, and
the controlling controls the motion of the character when a distance between the current state of the character and the nearest sample of samples included in the training data set of the transition controller while simulating the character is measured, and the distance is less than or equal to a threshold established by a user.

19. A system for simulating a character, the system comprising:
a motion data optimization unit optimizing recorded motion data captured from human behavior using a displacement mapping and a PD control;
a character control unit performing controller training using the optimized motion data and controlling a motion of the character;
a controller training unit configured to perform controller training by using a collection of state-action trajectories;
a controller improvement unit configured to improve the controller by using the motion data and the displacement mapping; and
a transition control unit configured to control a transition between states of behaviors by using the controller,
wherein the controller training unit selects at least one sample near a novel state when the novel state of the character is provided at a subsequent time instance, and calculates a target pose by combining at least one output pose included in the at least one sample.

20. The system of claim 19, wherein the motion data optimization unit comprises:
a target motion generation unit generating a target motion by using the displacement mapping between an input motion and a displacement parameter; and
a simulated motion generation unit generating a simulated motion by using the target motion and an objective function.

21. The system of claim 20, wherein the motion data includes a plurality of input motions separated by time, and the motion data optimization unit further comprises:
a repetition unit enabling operations of the target motion generation unit and the simulated motion generation unit to be repeatedly performed for all input motions included in the motion data.

22. The system of claim 20, wherein the target motion generation unit generates the target motion by adding, to the input motion, an array of motion displacements generated by the displacement parameter, and
each element of the array of motion displacements is calculated by using a bell-shaped basis function.

23. The system of claim 20, wherein the simulated motion generation unit selects an initial value of the displacement parameter, repeatedly finds a local extremum of different initial values of displacement parameters, and calculates the simulated motion by establishing a minimum value of local extremum values as a minimum value of the objective function.

24. The system of claim 19, wherein the near sample is selected by using a distance between motion frames, and the distance between motion frames is measured by using a feature of the motion frames.

25. The system of claim 24, wherein the features of the motion frames include at least one of (1) a joint angle, (2) a position, a velocity, and a direction of a root node, (3) a position and a velocity of character feet, and (4) a ground contact, and
the distance between motion frames is calculated by squaring, weighting, and summing differences between feature vectors F(t) of the motion frames.

26. The system of claim 19, wherein the controller improvement unit monitors a trajectory of the character by using a training data set included in the motion data, recognizes an unsuccessful situation of when the trajectory of the character deviates from a trajectory according to the training data set at an amount greater than a predetermined standard, and rolls back the entire system to a nearest cycle of a motion of the character when recognizing the unsuccessful situation.

27. The system of claim 26, wherein the controller improvement unit adds a new state-action trajectory to the training data set, and blends the state-action trajectory with an original trajectory by using the displacement mapping.

28. The system of claim 19, wherein the controller includes a stationary controller controlling a change of the state of the character in a predetermined range, and a transition controller controlling a transition between stationary controllers, and
the transition control unit controls the motion of the character when a distance between the current state of the character and the nearest sample of samples included in the training data set of the transition controller while simulating the character is measured, and the distance is less than or equal to a threshold established by a user.

* * * * *